United States Patent
Goodwin et al.

(10) Patent No.: US 9,135,053 B2
(45) Date of Patent: *Sep. 15, 2015

(54) MANAGING PROCESSES IN A REPOSITORY (71) Applicant: International Business Machines Corporation, Armonk, NY (US)

(72) Inventors: Richard Thomas Goodwin, Dobbs Ferry, NY (US); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,048

(22) Filed: Jan. 10, 2014

(65) Prior Publication Data
US 2014/0130049 A1 May 8, 2014

Related U.S. Application Data (63) Continuation of application No. 12/727,640, filed on Mar. 19, 2010, now Pat. No. 8,682,909.

(51) Int. Cl.
*G06F 17/30* (2006.01)
*G06F 9/46* (2006.01)
*G06Q 10/06* (2012.01)

(52) U.S. Cl.
CPC ............ *G06F 9/46* (2013.01); *G06F 17/30705* (2013.01); *G06F 17/30719* (2013.01); *G06Q 10/0637* (2013.01)

(58) Field of Classification Search
CPC ... G06F 11/324; G06F 17/30; G06F 17/3053; G06F 17/30719
USPC .................................. 707/757, 738; 718/100
See application file for complete search history.

(56) References Cited

U.S. PATENT DOCUMENTS

| 6,308,163 | B1 | 10/2001 | Du et al. | |
|---|---|---|---|---|
| 6,580,814 | B1 * | 6/2003 | Ittycheriah et al. | 382/115 |
| 8,682,909 | B2 * | 3/2014 | Goodwin et al. | 707/752 |
| 2003/0048265 | A1 * | 3/2003 | Bito et al. | 345/419 |
| 2004/0176980 | A1 | 9/2004 | Bulitta et al. | |

(Continued)

FOREIGN PATENT DOCUMENTS

JP 2007305130 A 11/2007

OTHER PUBLICATIONS

K. Pohl et al., "PRIME—Toward Process-Integrated Modeling Environments," ACM Transactions on Software Engineering and Methodology, Oct. 1999, pp. 343-410, vol. 8, No. 4.

(Continued)

*Primary Examiner* — Yuk Ting Choi
(74) *Attorney, Agent, or Firm* — Janice Kwon; Ryan, Mason & Lewis, LLP (57) ABSTRACT

A method of managing a plurality of processes in a repository of a computer system is disclosed. For example, the method includes forming a model associated with differences among the plurality of processes. The model associated with differences includes one or more features for expressing the differences. The method further includes forming a model of priority among the one or more features, and organizing the plurality of processes according to the model associated with differences and according to the model of priority. At least one of the one or more features is a semantic feature. One or more of the forming of the model associated with differences, the forming of the model of priority and the organizing of the plurality of processes are implemented on a processor device.

24 Claims, 6 Drawing Sheets

300A

```
AGGREGATE-BASED SUMMARY

311 — Summary generated at: Tues Jan 12 16:41:29 EST 2010

312 — Top 5 phrases (non-steps) in repository = Reporting; Contact management;
       Financial settlement; Proactive monitoring; Production planning 313 — PROCESSES STATITICS
       Number of processes in repository = 103
       Average steps/process = 16.7, range = [0, 81]

314 — Top 5 step names: Create/Process notification; Confirm time; Archive
       maintenance documents; Enter technical data; Modify technical object structure
```

(56) References Cited

U.S. PATENT DOCUMENTS

| | | | |
|---|---|---|---|
| 2005/0125474 A1 | 6/2005 | Pednault | |
| 2005/0165822 A1* | 7/2005 | Yeung et al. | 707/102 |
| 2006/0184410 A1 | 8/2006 | Ramamurthy et al. | |
| 2007/0265900 A1 | 11/2007 | Moore | |
| 2008/0033995 A1 | 2/2008 | Casati et al. | |
| 2008/0066072 A1* | 3/2008 | Yurekli et al. | 718/104 |
| 2008/0178164 A1 | 7/2008 | Brown et al. | |
| 2009/0018877 A1 | 1/2009 | Houck et al. | |
| 2011/0029947 A1* | 2/2011 | Markovic | 717/102 |

OTHER PUBLICATIONS

Ali Bahrami, "Integrated Process Management: From Planning to Work Execution," Proceedings of the IEEE EEE05 International Workshop on Business Services Networks BSN '05, IEEE Press, Mar. 2005, pp. 11-18.

M. Vanhilst et al., "Repository Mining and Six Sigma for Process Improvement," International Conference on Software Engineering, Proceedings of the 2005 International Workshop on Mining Software Repositories, May 17, 2005, pp. 1-4.

Karen L. Myers, "Metatheoretic Plan Summarization and Comparison," Proceedings of the 16th International Conference on Automated Planning and Scheduling, Jun. 2006, 10 pages.

H. Krottmaier et al., "PROBADO—A Generic Repository Integration Framework," Lecture Notes in Computer Science, Proceedings of the 11th European Conference on Research and Advanced Technology for Digital Libraries, Aug. 2007, pp. 518-521, vol. 4675.

* cited by examiner

AGGREGATE-BASED SUMMARY

311 — Summary generated at: Tues Jan 12 16:41:29 EST 2010

312 — Top 5 phrases (non-steps) in repository = Reporting; Contact management; Financial settlement; Proactive monitoring; Production planning 313 — PROCESSES STATITICS
Number of processes in repository = 103
Average steps/process = 16.7, range = [0, 81]

314 — Top 5 step names: Create/Process notification; Confirm time; Archive maintenance documents; Enter technical data; Modify technical object structure

*FIG. 3A*

GROUP-BASED SUMMARY

321 — Summary generated at: Tues Jan 12 16:41:29 EST 2010

322 — Finding and reporting clusters by comparator = Processes Goals Jaccard Comparator 323 — CLUSTER STATISTICS
Number of clusters = 4
Average cluster size = 2.25, Range = [2,3]

324 — Cluster 0 (size=2): [ID85} Case management
 - [ID89} Case management
Cluster 1 (size=2): [ID86] Case Resolution and closure
 - [ID91] Case resolution and closure
Cluster 2 (size=3): [ID87] Reporting and trend analytics
 - {ID93] Reporting and trending analytics, [ID98 Reporting and trending analytics
Cluster 3 (size=2): [ID92] Corrective action preventive action (CAPA)

PROCESS VARIANT ANALYSIS

335 — Threshold used = 0.2
332 — Finding and reporting clusters by comparator = Processes Steps Jaccard Comparator 333 — CLUSTER STATISTICS
Number of clusters = 9
Average cluster size = 5.4, Range = [2, 33]

334 — Cluster 0 (size = 3) [ID0} Portfolio management
- [ID0] Program management, [ID3] Capacity management
Cluster 1 (size = 22): [ID7] Target evaluation
- [ID8] Lead finalization, [ID9] Preclinical trials, [ID15] Study definition and design, [ID16] Patient recruitment and enrollment, [ID20] Clinical data management, [ID21] Planning and forecasting, ....., [ID102] Reporting

. . .

Cluster 8 (size=3): [ID93] Reporting and trending analytics
- [ID94] Incidence identification, [ID98] Reporting and trending analytics

MANAGING PROCESSES IN A REPOSITORY

CROSS-REFERENCE TO RELATED APPLICATION

This application is a Continuation of U.S. patent application Ser. No. 12/727,640, filed on Mar. 19, 2010, now U.S. Pat. No. 8,682,909, the disclosure of which is incorporated herein by reference.

FIELD

The present invention relates generally to managing processes in a repository of a computer system and, more particularly, to organizing the processes according to features or dimensions used to express differences among the processes and according to the significance of the features or dimensions.

BACKGROUND

A process generally refers to a description of a set of coordinated activities associated with a task. An exemplary process may be associated with the task of providing purchased goods to a customer or the task of billing a customer for the purchased goods. Other exemplary types of processes include chemical processes, information technology processes, research processes and manufacturing processes.

Processes may describe, for example, plans to meet goals (e.g., plans expressed in a planning domain definition language (PDDL)), specification of functionality in a to-be-built system (e.g., processes that may be expressed in different notations), or behavior for performing tasks (e.g., web processes).

Once a process is established, the process may be stored, along with other processes, in a repository of processes in a computer system. Processes may be stored in order to be available for implementation. A large number of processes may be available from a repository of processes. Users may access the repository in order to obtain or inspect processes contained therein. Users may access a repository in order to find processes or characteristics of processes by, for example, searching the repository with keywords.

SUMMARY

Principles of the invention provide, for example, methods, apparatus and systems for managing a plurality of processes in a repository of a computer system.

In accordance with a first aspect of the invention, a method of managing a plurality of processes in a repository of a computer system comprises forming a model associated with differences among the plurality of processes. The model associated with differences comprises one or more features for expressing the differences. The method further comprises forming a model of priority among the one or more features, and organizing the plurality of processes according to the model associated with differences and according to the model of priority. At least one of the one or more features is a semantic feature. One or more of the forming of the model associated with differences, the forming of the model of priority and the organizing of the plurality of processes are implemented on a processor device.

In accordance with a second aspect of the invention, a system for managing a plurality of processes in a repository of a computer system is provided. The system comprises modules for implementing the above method.

In accordance with a third aspect of the invention, apparatus for managing a plurality of processes in a repository of a computer system is provided. The apparatus includes a memory and a processor coupled to the memory. The apparatus is configured to perform the above method.

In accordance with a fourth aspect of the invention, an article of manufacture for managing a plurality of processes in a repository of a computer system is provided. The article of manufacture comprises a computer readable storage medium tangibly embodying a computer readable program code which, when executed, causes a computer to carry out the above method.

Advantageously, principles of the invention provide, for example, an in-depth understanding of existing processes, identification of common processes and common portions of processes, identification of novel processes and uniqueness thereof, and determination of process gaps. Principles of the invention may further provide, for example, efficient reuse of assets (i.e., processes), better process repository design and support for user queries.

These and other features, objects and advantages of the present invention will become apparent from the following detailed description of illustrative embodiments thereof, which is to be read in connection with the accompanying drawings.

DETAILED DESCRIPTION

Principles of the present invention will be described herein in the context of illustrative embodiments of methods, apparatus and systems for managing (e.g., summarizing) a collection of processes. It is to be appreciated, however, that the principles of the present invention are not limited to the specific apparatus, systems and methods illustratively shown and described herein. Rather, the principles of the invention are directed broadly to techniques related to managing and summarizing processes. For this reason, numerous modifications can be made to the embodiments shown that are within the scope of the present invention. That is, no limitations with respect to the specific embodiments described herein are intended or should be inferred.

Embodiments of the invention provide a user with tools and methods for efficiently extracting information about processes within a collection of processes (e.g., a repository of processes). The user may be provided with, for example, insight into the processes, organization of the processes, and summaries of the processes or groups thereof.

The term "model," as used herein, generally refers to a representation of aspects or features of a given system, method, entity, condition, circumstance, or the like, which presents knowledge of that given thing in usable form. Thus, by way of example, as used herein; a "difference model" is a representation of differences among a plurality of processes, and a "significance model" is a representation of priority among the one or more features.

The terms "syntactic" and "semantic" occur frequently in linguistics and computer science. In general, syntactic refers to structure and semantic refers to meaning. With respect to languages, the terms syntax and syntactic refer to grammatical structure whereas the term semantics refers to the meaning of the vocabulary symbols arranged with that structure. As used herein, the syntax of a process includes one or more attributes (e.g., metadata) that describe structure of a process. Thus, syntactic may refer to one or more attributes (e.g., metadata) that describe structure of a process. As used herein, semantics refers to attributes (e.g., metadata) that describe or give meaning to a process. Which attributes are syntactic and what are semantic may depend, for example, on the user or a usage context. Embodiments of the invention allow distinction between semantic and syntactic to be specified, but does not necessarily impose any classification based on process representation.

Methods and embodiments of the invention automatically summarize a collection of processes and may provide, for example, content-based process summaries or information. Methods of the invention may work on most types of process content including metadata, syntactic information like activities, process features interpreted as semantic annotations, and multi-dimensional textual content. The methods include, for example, filtering analyses based on significance. The methods may provide a summary with insights about what a repository contains at the aggregate level as well as in subsets (clusters) of processes. The summary may be formed using, for example, an extensible set of process distance measures. The methods may be employed on, for example, diverse collections containing hundreds of processes. The methods, for example, may provide previously unavailable correct and valuable information, are computationally efficient and are scalable and general-purpose. Exemplary methods of the invention may be applicable to a broad class of process representations, provide an ensemble of analyses on content of processes, allow creation of summaries based on significance, not require human intervention, be configurable to use various input formats and provide novel insights into processes and collections of processes.

As used herein, a process refers to a recordable or storable description of a set of coordinated activities. The coordinated set of activities may include, for example: definitions of the inputs, outputs, pre-conditions and post-conditions of the activities; identifying the actors; identifying data (e.g., data to be manipulated); identifying dependencies among the activities; and identifying business policies and metrics that are needed to manage the activities. Plans (e.g., plans created in artificial intelligence planning) may describe, for example, expectations for when a process is implemented in the future and for a set of activities that make up the process. Business processes are an exemplary type of processes. A business process may specify, for example, functionality for a to-be-built system. Business processes may be presented or described in different notations, for example, for business processes, described in the graphical Business Object Model (BOM) in the Websphere Business Integration (WBI) modeler tool or in the Business Process Modeling Notation (BPMN), and for information technology processes, described in Business Process Execution Language for Web Services (BPEL). Business processes may be presented or described, for example, in a semi-structured format, such as a business processes presented in SAP Solution Composer (SC) represented in extensible markup language (XML), or in an unstructured format, for example, text files following a template (e.g., Process Definition Documents (PDDs) in SAP projects). Yet another type of process describes executable behavior. Workflows represented in BPEL and Web processes created by a co-scripter tool are exemplary instances of such processes. Process descriptions are commonly stored in repositories. Exemplary manifestations of processes include: (i) intended system characteristics; (ii) usage domain; and (iii) process content. Examples of intended system characteristics include expected behavior, intended behavior (specification), executable behavior and common functionality (specification). Examples of usage domains include artificial intelligence planning, business transformation, business modeling, co-scripter web scripts and implementation. Examples of process content include steps, annotations, products, roles, resources, organizations, metrics, data and messages.

There can be a large number of processes and associated variants available from different situations (e.g., client projects). For example, a repository of a computer system may contain thousands of business processes stored from projects. It is to be understood that a computer system may generally include one or more computing devices, which may or may not be distributed. Methods and techniques of the invention may determine, for example, characteristics of the processes that are stored, and/or not-stored, in a given repository. Examples of characteristics may include novelty of processes, types of processes (e.g., a variant process), classes of existing processes, and utility of processes (e.g., a high utility from a new process in a repository).

There are a large number of processes available, both with and without, the knowledge of their provenance. Examples are: (i) after a software project is completed, use-cases representing important business processes could be accumulated or stored as assets to be reused in other projects; (ii) an organization can store workflows and test cases of transactions done in the past; and (iii) when a planner generates plans in a domain over time, the plans can be accumulated or stored. One exemplary approach to work with processes is to store the processes in a repository (e.g., a memory, a file system, database or commercial asset repository), and provide basic query support (e.g., browsing or key-words) to retrieve the processes. A user may obtain little insight from such a repository about the stored processes by browsing or plain statistics, especially when the repository is large and the user has little experience with the domain from which the processes came.

Consider the processes summarization problem stated as "summarizing a collection of processes to reveal insights into content of the processes without human intervention."

The challenge in solving this processes summarization problem is to determine what constitutes a good summary and then to build a general method which can deliver the summary while handling the diversity of process representations. What constitutes a good summary may depend on the perspective of the user. In the established area of text summarization, summaries may be indicative or informative. In the context of processes, if the user has no purpose in mind, summary needs may be considered to be indicative and may be provided by some repositories which report on what is stored in the repositories. However, most users (e.g., purpose driven users) may be objective-driven when looking at process repositories and the users may want an informative approach which works on the content of the processes.

Some exemplary purposes may be, for example: (i) finding high-level concepts in a collection; (ii) finding novel processes that share attributes with other processes and/or novel processes that do not share attributes with other processes; (iii) helping to resolve noise in a collection; and (iv) finding insights that matter to the user.

Figure 3A:
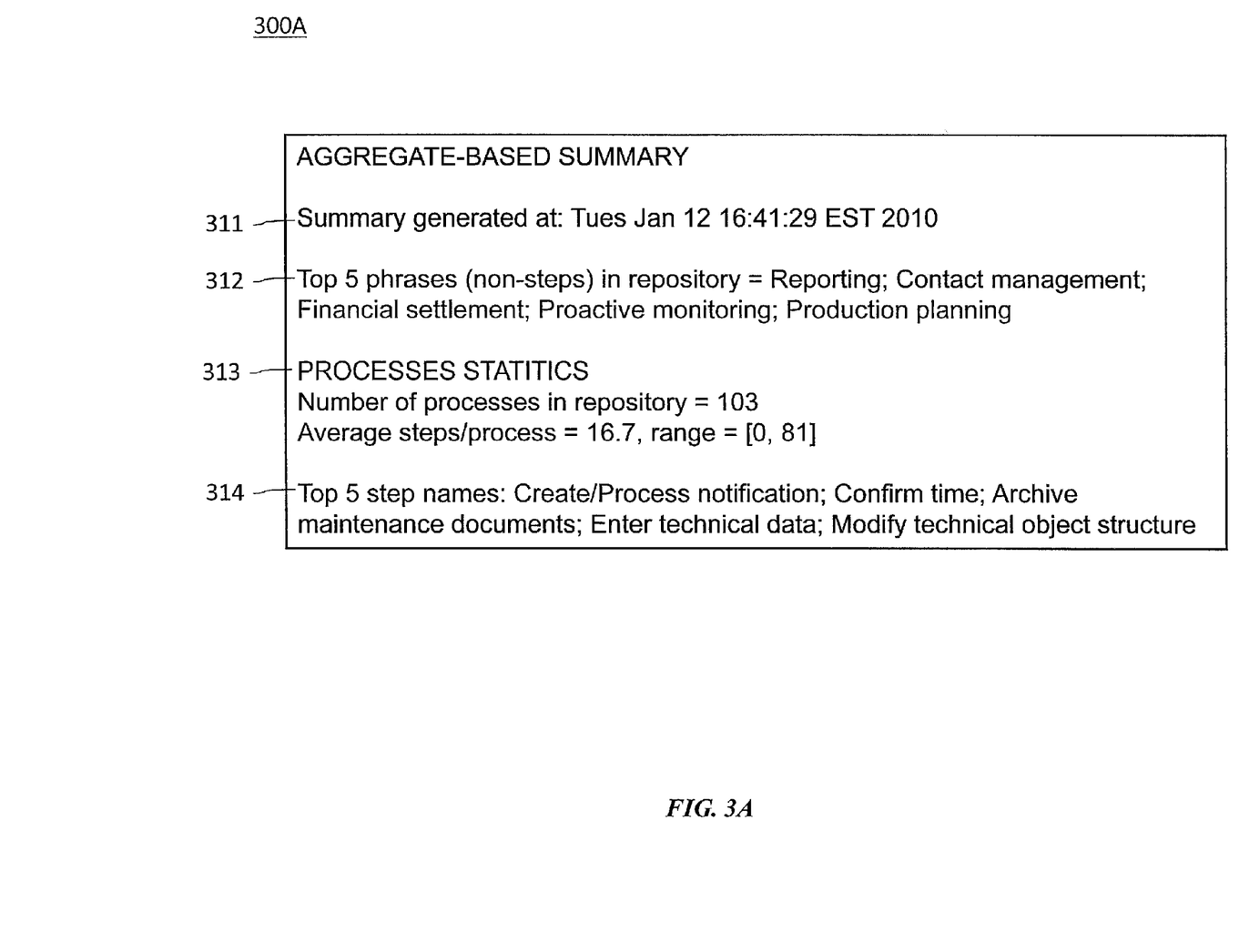
FIG. 3A shows an exemplary aggregate-based summary according to an embodiment of the invention.
Figure 3B:
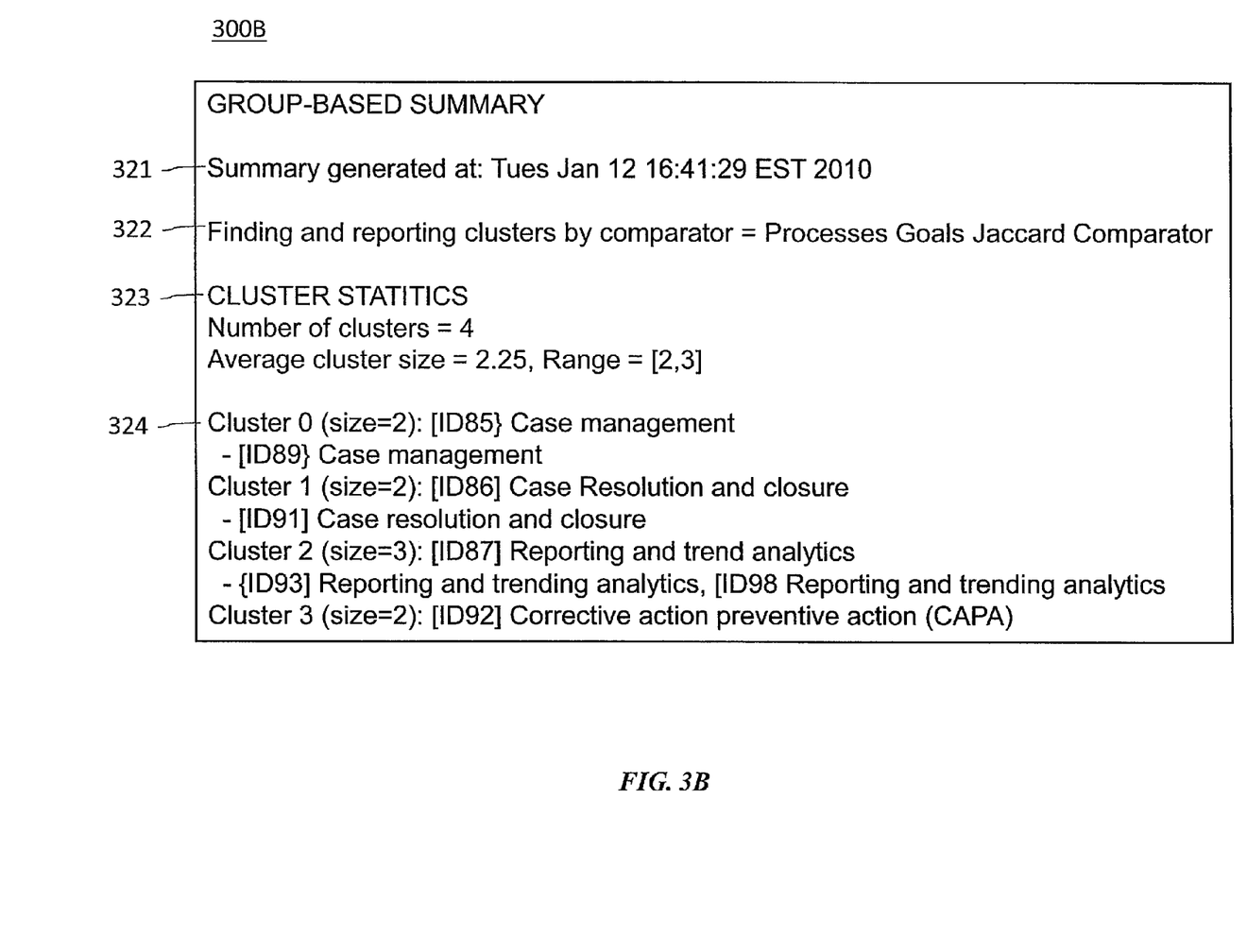
FIG. 3B shows an exemplary group-based summary according to an embodiment of the invention.
Figure 3C:
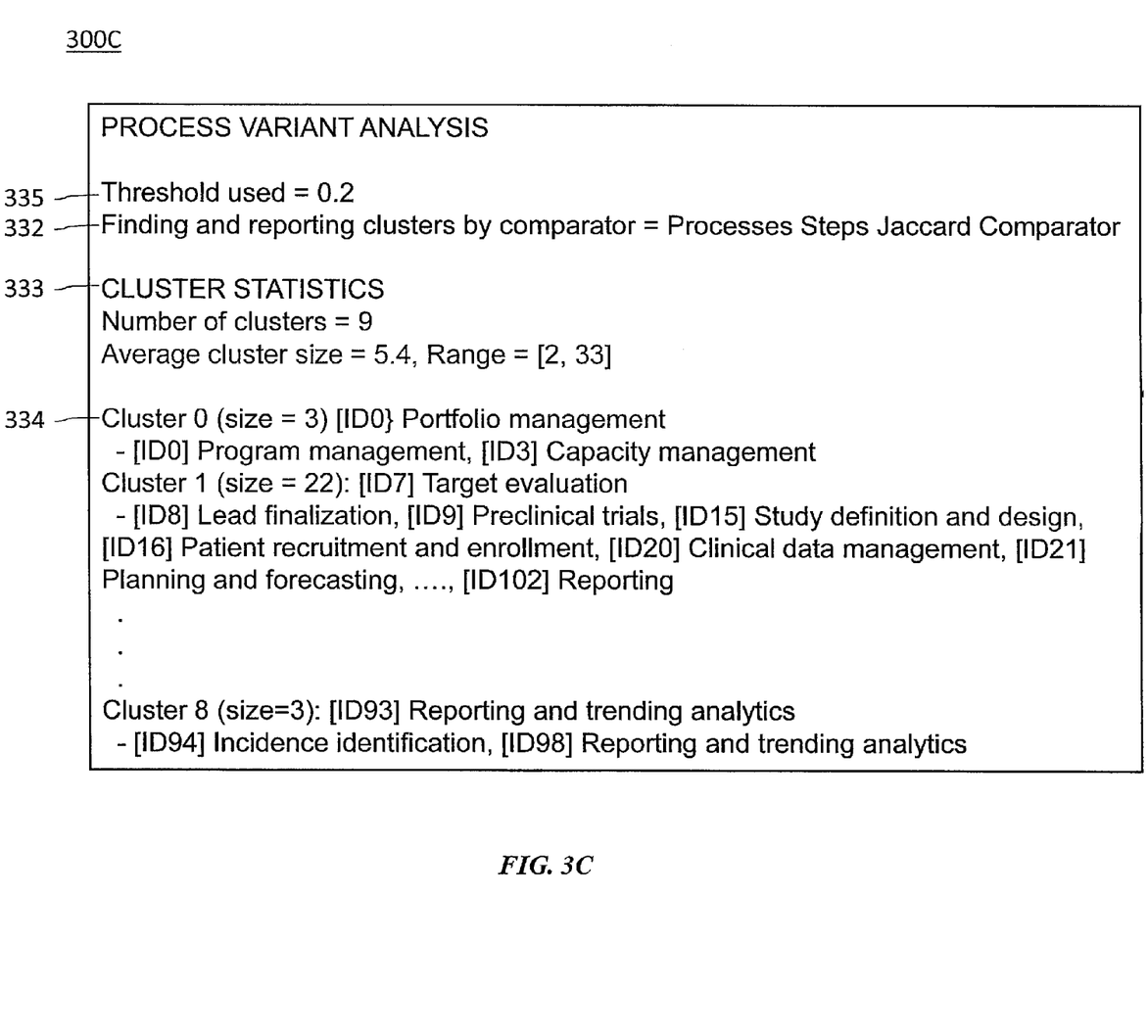
FIG. 3C shows an exemplary process variant analysis summary according to an embodiment of the invention.

A method of providing information about processes and/or providing processes summarization according to an embodiment of the invention is a flexible approach that is agnostic to input representations and works on most, if not substantially all, available types of process content including, for example, metadata, syntactic step information, process features interpreted as semantic annotations, and multi-dimensional textual content. The method may be, for example, implemented in Java. The method may not require all process attributes to be present and consequently, the method is easy to use with simple processes (e.g., plans) while sophisticated enough for complex process representations (e.g., business processes). Information or a summary produced by the method provides, for example, insights about what the repository contains at the aggregate level as well as in subsets (clusters) of processes. The subsets of processes may be built, for example, using an extensible set of process distance measures. FIGS. 3A, 3B and 3C, to be described herein, present exemplary samples of summary output by the method. The method may be used, for example, on diverse processes repositories comprising hundreds of processes. The method may provide, for example, previously unavailable correct and valuable information.

A need for process summarization on common process types is illustrated by considering exemplary types of processes and mechanisms available to work with these exemplary types of processes.

A first process type which is business processes. Collections of business processes are illustrated by one version of a solution composer tool that lists 620 processes prevalent in 26 industries specifying common business functionalities. The processes can be implemented, for example, by using packaged middleware and third party products (e.g., databases, workflow systems and user interfaces). An exemplary process may comprise description(s) and activity flow(s). XML files containing information about processes may be considered as one or more repositories. Any one of the repositories may contain, for example, hundreds of processes and without methods of the invention it may not be possible to get summaries of the processes.

A second process type is web (i.e., accessible using the Internet) processes. Collections of web processes exist. A tool referred to as a "co-scripter" (available from IBM Corporation, Armonk, N.Y.) may record web-based processes in human-readable scripts that can be shared on wikis. As used herein, a wiki is a website that allows the creation and editing of any number of interlinked web pages via a web browser using a simplified markup language or a text editor. Wikis are typically powered by wild software and are often used, for example, to create collaborative websites, to power community websites, for personal note taking, in corporate intranets, and in knowledge management systems.

A simple process (sequential script) is shown below. The simple process may be recorded with co-scripter. The simple process explains how to find information about Mahatma Gandhi on the web using a web search and an online or web-based encyclopedia. The script can be replayed or implemented automatically by anyone using a browser and having a co-scripter plugin.

The simple process is:
1. go to a specified search web page
2. enter "Mahatma Gandhi" into the search textbox
3. click on the search button
4. pause for 20 seconds
5. click on the "Mohandas Karamchand Gandhi-pedia, the free encyclopedia" link
6. pause for 30 seconds
7. click on the "Gandhi (disambiguation)" link Much software is web-based and a web process recording tool can be used to test the software. Consider a scenario where a web software project has to accomplish three functionalities: F*, the base functionality; F1, which reuses F* for situation 1 and has additional functionalities ($F1 \supseteq F^*$); and F2, which reuses F* for situation 2 and has additional functionalities ($F2 \supseteq F^*$). The co-scripter can be used to record how the software behaved while tested in the two situations F1 and F2. Like test cases from any other software, the recorded processes can be collected and later projects may benefit from their process summarization. A specific delivery web-based tool, herein named CA, may, for example, deliver content to consultants involved in packaged application projects. There is a small but growing repository of at least 25 test cases where the F* is in generic to CA (core CA), F1 is in CA for a first database management system and F2 is in CA for a second database management system. Authors can access the repository of test cases.

Collections of processes are prevalent. A user may want to perform, for example, the following tasks on a collection of processes: (i) find aggregate statistics (e.g., the number of processes in the repository); (ii) query by keywords, wherein the user has to know the terms on which to search; (iii) query by facets (i.e., pre-defined metadata to view the content of a carefully populated repository), wherein the processes have to be categorized properly with the facets and process content cannot be dynamically used in the query search; and (iv) query on XML. Methods of the present invention may provide, for example, organization and/or summaries of the collection of processes, and query searching that is insensitive to low-level syntax that has nothing to do with process content.

Methods of the invention may be, for example, generic and yet have a reasonable summarization behavior without human intervention. Hence, although modules for implementing the method (e.g., parsers, analyses and distance metrics) are configurable, in order to reduce human intervention, default settings may be used.

Figure 1:
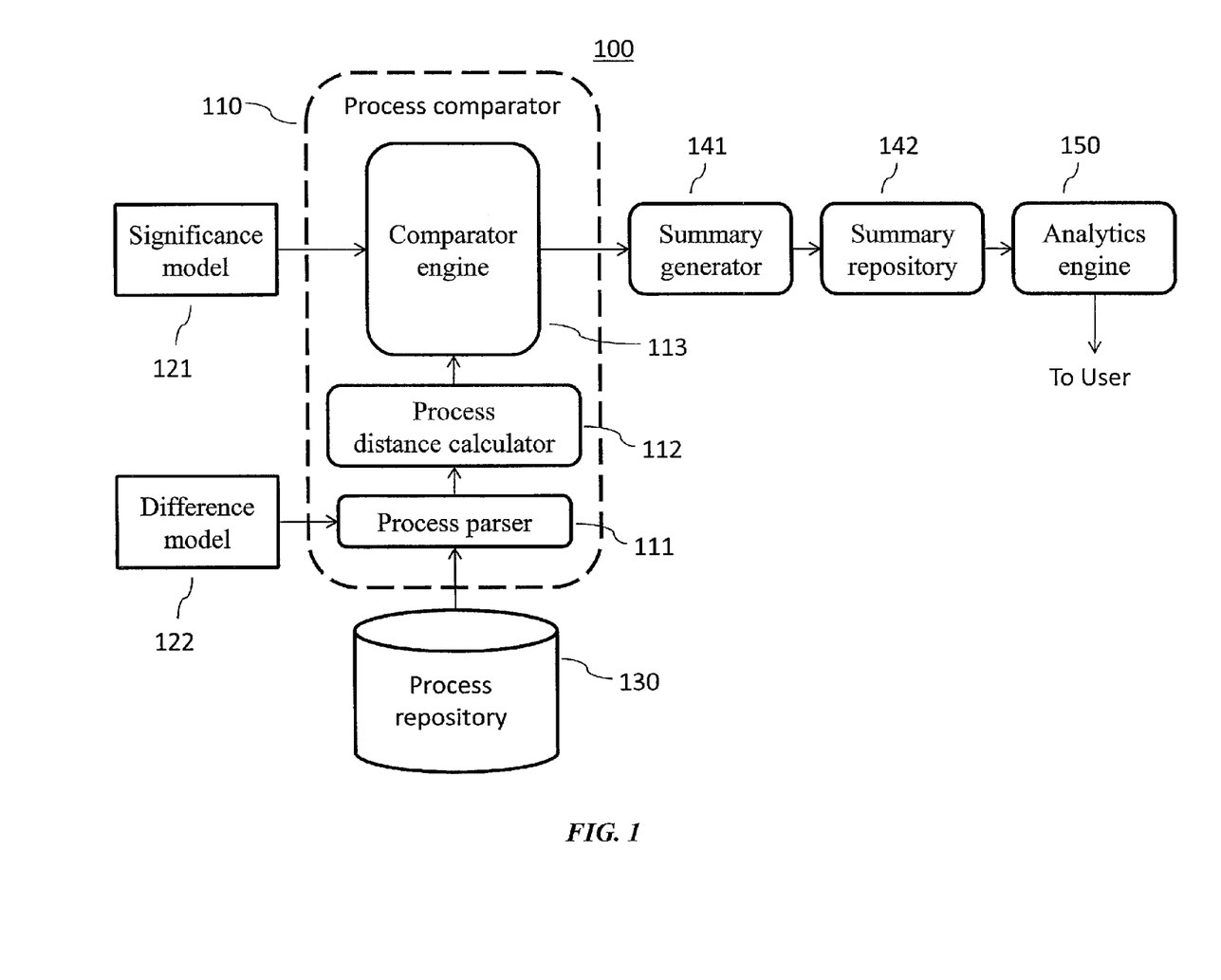
FIG. 1 illustrates a diagram of a system for managing processes of a collection of processes according to an embodiment of the invention.

FIG. 1 is a diagram of a system 100 for managing (e.g., organizing and/or summarizing) a collection of processes according to an embodiment of the invention. System 100 comprises a process comparator 110, a significance model 121, a difference model 122, a summary generator 141, a summary repository 142 and an analytics engine 150. The process comparator 110 comprises a comparator engine 113, a process distance calculator 112 and a process parser 111.

A process repository 130 is coupled to the process comparator 110, specifically to the process parser 111, and provides processes stored in the process repository 130 to the process parser 111. The processes are stored or represented in the process repository 130 in one or more specific formats, for example, stored or represented in extensible markup language (XML) format. The parser 111 parses the processes from the one or more specific formats, for example, from the XML representations of the process. It is understood that parsing, may also known as, for example, syntactic analysis and may comprise, for example, the process of analyzing text (e.g., text comprising a sequence of tokens such as words) to determine grammatical structure of the text with respect to a given grammar (e.g., a set of rules for forming strings in a language). Alternately or additionally, parsing may comprise, for example, analyzing the processes according to rules (e.g., rules according to canonical process specifications) to determine components of the process.

The process parser 111 may parse according to, for example, canonical process specifications including, for example: (i) what are the activities, (ii) containing inputs, (iii) outputs, (iv) pre-conditions and post-conditions; (v) who are the actors; (vi) what is the data that is manipulated; (vii) what are the dependencies among the activities; and (viii) what are the semantic annotations, including business policies, goals and metrics that are needed to manage the activities.

Although processes from different domains may come in different representations, the processes may share a common high-level semantics of representing a set of coordinated activities. Methods of the invention are applicable to most, if not all, process notations that can be parsed into or according to canonical process specifications. The parser 111 may comprises, for example, one or more parser adapters. For every process type (e.g., processes expressed in PDDL), there may be a specific parser adapter formed according to a simple interface to read files of the associated process type and create process data structures made up of syntactic and semantic information therein. The choice of what constitutes each of these categories is process type dependent. By way of examples only, in a canonical representation, syntactic information may include but are not limited to: (i) process steps; (ii) ordering of process steps; (iii) data artifacts; (iv) business artifacts (e.g., business resources roles and organizations); (v) resources and (vi) statistics. By way of examples only, semantic information may include but are not limited to: (i) goals; (ii) policies; (iii) metrics; (iii) sub-processes and (iv) annotations (e.g., annotations to account for anything else in process data).

The difference model 122 is coupled to the process comparator 110, specifically to the process parser 111, such that the difference model 122 is provided to the process parser 111. The difference model 122 comprises, defines or otherwise presents one or more features of processes (e.g., features or dimensions for expressing differences among processes). The processes addressed by the difference model 122 may include, for example, processes stored in the process repository 130. The parser 111 may parse the processes according to, for example, the one or more features of the difference model 122.

The one or more features of the processes associated with the difference model 122 may be, for example, syntactic (e.g., the structure of the process) or semantic (e.g., what the process does). Thus, the difference model features can comprise syntactic and/or semantic parts of process descriptions. By way of examples only, syntactic features may include but are not limited to: (i) process steps; (ii) ordering of process steps; (iii) data artifacts; (iv) business artifacts (e.g., business resources roles and organizations); (v) resources and (vi) statistics. By way of examples only, semantic features may include but are not limited to: (i) goals; (ii) policies; (iii) metrics; (iii) sub-processes and (iv) annotations (e.g., semantic annotations to account for anything else in process data).

The process parser 111 is further coupled to the process distance calculator 112 to provide the parsed components of the processes to the distance calculator 112. The distance calculator 112 calculates distances between processes according to the one or more features. The process distance calculator 112 is further coupled to the comparator engine 113. Output from the distance calculator 112 comprises inter-process distances among the processes stored in the process repository. The output from the distance calculator 112 (e.g., the inter-process distances) is provided to the comparator engine 113.

The significance model 121 is coupled to the process comparator 110, specifically to the comparator engine 113, and provides to the comparator engine 113 priority among the one or more features, and/or relative importances of the one or more features. Thus, the significance model may be, for example, a model of priority among the one or more features. The priority or relative importance may be provided by, for example, a user or an application. The comparator engine 113 may determine significant inter-process distances from the inter-process distances according to the significance model 121 (e.g., the priority or relative importance of the one or more features).

The significance model 121, for example, may differentiate results or products of processes from methods of processes. The significance model 121, for example, may include one or more ordering functions that at least partially orders components of the difference model 122 (e.g., features of processes, for example, inter-process distances). By way of a non-limiting example only, the significance model may order from high to low significance: (i) goals; (ii) sub-processes; (iii) data model; (iv) control flow and (v) resources, with goals having the highest significance and control flow having the lowest significance.

The process comparator 110, specifically the comparator engine 113, is further coupled to the summary generator 141 and provides output from the comparator engine 113 (e.g., the significant inter-process distances) to summary generator 141. The summary generator 141 may generates one or more summaries of the processes. The summary generator 141, for example, may provide some or all of the significant process distances among all processes. Alternately or additionally, the summary generator 141 may cluster the significant process distances and provide summaries comprising the clusters and/or related cluster distances.

The summary generator is further coupled to the summary repository 142 and provides the generated summaries for storage in the summary repository 142. The summary repository 142 may comprise, for example, one or more clustering of processes that are grouped together based on significant inter-process distances. For example, a clustering of processes may be according to one or more similarities among the processes of the cluster, or according to one or more dissimilarities among the processes of the cluster.

The summary repository 142 is further coupled to the analytics engine 150. The analytics engine 150 may is operative to respond to user query on summaries in the summary repository 142 and may be implemented, for example, using XML path language (Xpath). Xpath is a query language for selecting nodes (e.g., an abstract basic unit used to build linked data structures such as trees, linked lists, and computer-based representations of graphs) from an XML document. In addition, XPath may be used to compute values (e.g., strings, numbers, or Boolean values) from the content of an XML document.

Methods of the invention have been applied to various categories of business processes, for example, cross-industry processes that reflect industry neutral processes and industry specific business processes such as automotive processes and pharmaceutical processes. Methods of the invention are capable of producing summaries from processes with missing data.

It is noted that even as few as five top keywords in each collection of processes may provide good indicators of a domain of one or more processes in the collection. For example, regarding automotive processes, keywords on vehicle management, after-sales support, extended warehousing and logistics, and sequenced manufacturing were may be found and provided.

Clusters found using semantic features may correctly identify processes that are in the same domain. For example, export control and letter of credit in the cross-Industry domain. Furthermore, clusters found using syntactic features may accurately identify process variants that share processes. In many cases, methods of the invention may show, for example, that there are very few novel processes in a collection of processes.

Novelty may be measured, for example, by the percent of processes without variants. By way of example only, in one exemplary group of applications, the maximum novelty of processes varied from 1% to 18% with cross-industry type of processes having the least novelty. Novelty may depend upon, for example, the distance measure used.

Methods of the invention have been further applied to web processes. By way of example only, methods of the invention were applied to web processes recorded by a co-scripter tool. All test cases of F1 were correctly grouped. Test cases of F2 were correctly subdivided by three further clusters. Miscellaneous test cases were not in any cluster. The summary was useful in detecting that some of the processes were titled incorrectly.

Systems and methods of the invention may determine, for example, the summary of process repositories based on the content of the process repository.

Figure 2:
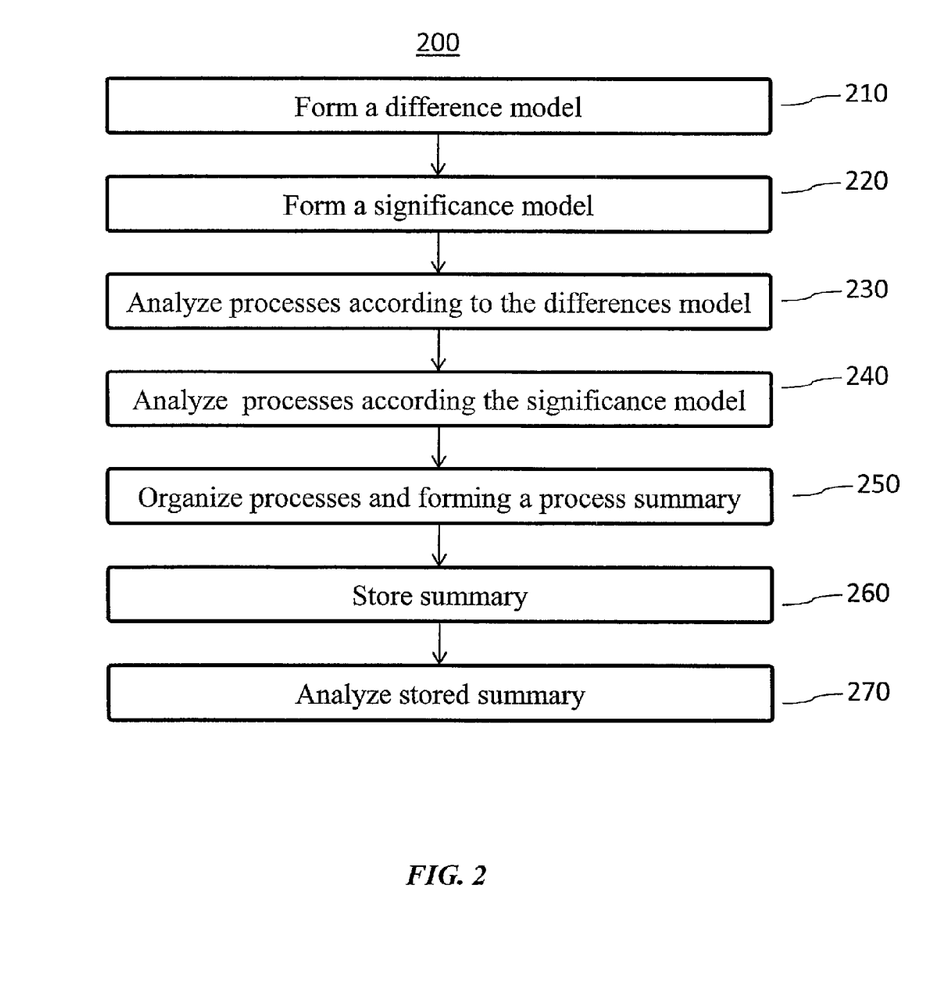
FIG. 2 shows a flow diagram of a method of managing processes of a collection of processes according to an embodiment of the invention.

FIG. 2 shows a flow diagram of a method of managing (e.g., organizing and/or summarizing) processes of a collection of processes (e.g., processes in a repository of a computer system) according to an embodiment of the invention. Summaries of the collection of processes may be formed that may be based on, for example, content of the processes of the collection of processes.

Step 210 comprises forming a difference model, for example, the difference model 122.

Step 220 comprises forming a significance model, for example, the significance model 121.

Step 230 comprises analyzing processes (e.g., the processes stored in the process repository 130) according to the difference model. Prior to analysis, the processes may be loaded from a repository, for example, the process repository 130. The analysis may be performed by, for example, the process comparator 110. The analysis may comprise, for example, parsing by parser 111 according to one or more features of the difference model (e.g., the one or more features of difference model 122). The analysis may further comprise, for example, calculations of one or more distance measure among the processes (calculation of process distances) by process distance calculator 112 (e.g., group analysis). The distances may be calculated according to the parsing and/or features associated with the difference model.

Once the processes are parsed (e.g., parsed into canonical representations according to canonical process specifications), different types of analyses are possible based on the information from the parsing (e.g., information in the canonical representation). Aggregate and group analyses are considered. Other types of analysis may be added. In step 230, analyses may be, for example, operative to discover insights while in step 240, some results may be filtered out. It is noted that, depending on specific data instances, an analysis may fail if relevant data is missing.

Aggregate analysis refers to obtaining or determining aggregate information discovered for the whole or aggregate collection of processes, for example: (i) number of processes in the collection; (ii) top-k keywords in the collection, for any desired number k; and (iii) top-m process steps in the collection, for any desired number m. The top-k keywords can be from any aspect of the multi-dimensional information in the processes of the collection. The top-k keywords have the potential to reveal unexpected results.

Group Analysis refers to finding or determining one or more subsets of processes which are common by some measure (e.g., a distance measure). Subsets formed by group analysis may provide meaningful insight to a user. For grouping processes, clustering algorithms provide a natural unsupervised solution framework; however, the distance function has to be provided. Clustering algorithms are known in the art. One or more measures applied to the process content may be use, for example, grouping with both syntactic and semantic measures on the process content may be used. With multiple measures, grouping results may be, for example, aggregated (see B. Srivastava and D. Mukherjee, Organizing Documented Processes, proceedings of the IEEE service computing conference, pages 25-32, IEEE Computer Society, 2009, the disclosure of which is incorporated herein by reference) or presented with groupings selectively based on analysis driven significance. One embodiment of the invention presents groupings selectively based on analysis driven significance.

Selected clustering algorithm and method of the invention may, for example, measure distance between processes. It is noted that there various methods for forming or building similarity scores. Steps for forming similarity score may comprise, for example, first finding pairs of similar processes using comparable (syntactic or semantic) contents of the processes and then using pair-wise similarity with standard transitive closure techniques to build clusters of overall equivalent processes.

Consider examples of distance measures between processes using different content structure.

Let $\delta(S_i, S_j) \to [0, 1]$ denote a distance function between a pair of processes. A value of 0 represents complete similarity of processes while 1 represents complete dissimilarity between processes. To create a distance measure, the basis for comparison and the method for computation need to be decided. Exemplary distance measures derived from syntactic and semantic content of the processes are now defined.

Consider Syntactic distance measures. Steps of a process are commonly considered as syntactic content of the process. Two measures based on process steps are now defined. $\delta$ #steps is defined on the number of steps in the processes while $\delta$ steps is defined on the number of steps common between two processes. Note that steps can repeat in a process and hence $\delta$ steps must accommodate repeated steps.

$$\delta\#steps=[\|S_i\times\#steps - S_j\times\#steps\|]/[\max(S_i\times\#steps, S_j\times\#steps)] \qquad \text{EQ. 1:}$$

$$\delta steps(S_i, S_j) = 1 - [\|s_i \in S_j \times steps\| + \|s_j \in S_i \times steps\|]/[S_i \times \#steps + S_j \times \#steps], \qquad \text{EQ. 2:}$$

where $s_i \in S_i \times steps$ and $s_j \in S_j \times steps$.

Consider Semantic distance measures. In the canonical process representation, annotations capture the semantic content of the process as obtained from the parser. Similar to $\delta$ steps, define a measure of semantic similarity on the number of annotations common between two processes as $\delta$ anns.

$$\delta anns(S_i, S_j) = 1 - /[\|s_i \in S_j \times anns\| + \|s_j \in S_i \times anns\|]/[S_i \times \#anns + S_j \times \#anns],$$

where $s_i \in S_i \times anns$ and $s_j \in S_j \times anns$.

Step 240 comprises analyzing processes according to the significance model. For example, the analysis of step 240 may be performed on the results of the analysis of step 230. Remembering that the significance model may comprises priorities or relative significances for each of the one or more features, the analysis may, for example, comprise ranking, grouping or otherwise analyzing the processes according to the significance model (e.g., according to the priority or relative importance among the features or differences associated with the difference model as expressed by the significance model), for example, as applied to the results of the analysis performed in step 230. The analysis according to the significance model may, for example, filter the results of the analysis of step 230 according to the priorities or relative importance among the features. The results of the filtering may be a portion of the results of the analysis of step 230 according to the priorities or relative importances as presented by the significance model and/or a predetermined threshold. The analysis according to the significance model may, for example, determine which one or more of the distance measures produced in the analysis of step 230 are of higher important and provide these higher importance distance measures while filtering out the remaining distance measures from the analysis of step 230. Step 240 may be performed by, for example, the comparator engine 113.

Although much analytics can be done on process content, the objective of a summary is for the summary to be concise and relevant to a user. Using the significance model (e.g., the significance model 121), the user can convey an interest in differentiating fragments or portions of process content. One such differentiation may be, for example, the differentiation between ends of a process (e.g., results or goals of the process) and the means to achieve the ends of the process (e.g., steps of a process). A high to low partial order of process content may be used to filter the analyses result from step 230 to provide information to form the summary. The filtering may be performed by, for example, the comparator engine 113. The significance model may express the significance or priority of, for example, goals, annotations, data artifacts, steps and then resources.

Step 250 comprises organizing and/or grouping processes based on results of the analysis performed in steps 230 and 240. Because the analysis of step 230 is according to the difference model and the analysis of step 240 is according to the significance model, step 250 comprises organizing and/or grouping processes according to the difference model and according to the significance model. Therefore, step 250 may comprise, for example, organizing of the plurality of processes by arranging the processes of the collection of processes according to (i) factors common among two or more of processes, (ii) one or more distance measures among the processes and/or (iii) novelty of the processes. The factors may be, for example, content, attributes, concepts, keyword, or facets. In the context of arranging processes, as used herein, arranging means a logical grouping, ordering or summarizing of the processes by which the process may be presented, interrogated, observed or otherwise used by a user. Processes may or may not be actually arranged in a physical sense, for example, an order in which the processes are stored in a repository.

Step 250 further comprises forming a process summary of the collection of processes. For example, the summary reflects or is according to the organizing or the grouping of processes also performed in step 250. Alternately, the summary may be according to, for example, the analysis performed in step 230 and/or the analysis performed in step 240 but without the organizing or grouping of processes. The summary may represent, for example, all of the processes in the collection of processes or only some of the processes in the collection of processes. Step 250 may be performed by, for example, by the summary generator 141. The summary may be provided in a format the user is interested in. For example, the summary may be provided in text and/or an XML document. Using style-sheets, the output can be converted to other formats. Exemplary summaries are shown in FIGS. 3A, 3B and 3C described below.

A metric of merit of summaries may be, for example, a compression ratio, that is, the size of the summary compared to the size of the original text, and a retention ratio indicating an amount of process information that is provided by the summary.

Step 260 comprises storing the process summary produced in step 250. The process summary may be stored in, for example, summary repository 142. Note that the process summary is typically a summary representing may processes.

Step 270 comprises analyzing the stored process summaries. For example, the stored process summaries may be analyzed according to a query of a user to provide requested aspects of the summary. The analysis may be performed by, for example, analytics engine 150 and the results provided to the user.

FIGS. 3A, 3B and 3C show portions of exemplary summaries generated on a sample collection of 103 business processes.

FIG. 3A shows an exemplary aggregate-based summary 300A according to an embodiment of the invention. The exemplary aggregate-based summary 300A comprises a timestamp 311, a list of top non-step phrases 312, process statistics 313 and list of top step names 314. The phrases in the top non-step phrases 312 may be considered to be keywords. The process statistics 313 and the steps listed in the list of top step names 314 are considered process related.

FIG. 3B shows an exemplary group-based summary 300B according to an embodiment of the invention. The exemplary group-based summary 300B comprises a timestamp 321, name of a comparator engine 322 used (e.g., the name of comparator engine 113), cluster statistics 323, and cluster information 324 including identifications (ID numbers). In this example, the clusters listed are semantic clusters.

FIG. 3C shows an exemplary process variant analysis summary 300C according to an embodiment of the invention. The exemplary process variant analysis summary 300C comprises a name of the comparator engine 332 used (e.g., the name of comparator engine 113), the threshold setting 335 of the comparator, cluster statistics 333, and cluster information 334 including identifications (ID numbers). In this example, the clusters listed are syntactic clusters.

Methods, systems and apparatus of the invention are usable or adaptable for use on processes in various or multiple formats. By way of example only, a process normalizing module may convert a particular process format (i.e., a format that a process is expressed in) to a standard format or a normalized format. A process normalizing module may comprise, for example, software or software and hardware to perform the instructions of the software. Various process formats may be converted to the standard format by respective process normalizing modules. One or more process normalizing modules may convert the respective one or more process formats prior to, for example, operations of the process comparator 110. In this example, the one or more process normalizing modules are coupled to the process repository 130 and to the process comparator 110.

Advantageously, methods of the invention may reduce the time required to fulfill user queries. The summary repository 142 may be, for example, built off-line (i.e., built prior to user queries). Furthermore, adding processes to the repository and at least a portion of updating the organization of processes and process summaries may be done, for example, off-line. For example, analysis according to the difference model may be performed off-line while analysis according to the significance model may be performed in response to a user query, for example, a user query containing information to build a significance model specific to the query. In this example, the significance model is formed in response to and in accordance to the query.

In specific embodiments of the invention, information for forming the difference model and/or the significance model is provided by a user. The information may be contained within a query and be specific to that query or may be associated with a specific user and/or a plurality of queries from a specific user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1, 2, 3A, 3B and 3C, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1, 2, 3A, 3B and 3C, can also include, as described herein, providing a system, wherein the system includes distinct modules (e.g., modules comprising software, hardware or software and hardware). By way of example only, the modules may include but are not limited to a difference model forming module operative to form the model associated with the differences among the plurality of processes, a priority model forming module operative to form the model of priority among the one or more features, an organizing module operative to organize the plurality of processes according to the model associated with differences and according to the model of priority, a first analyzing module operative to analyze the plurality of processes according to the model associated with the differences among the plurality of processes, a second analyzing module operative to analyze the plurality of processes according to the model of priority, a summary forming module operative to form a summary of the plurality of processes according to the organization of the plurality of processes, a summary storing module operative to store the summary in a summary repository, and a third analyzing module operative to analyze the summary according to a query of a user. These and other modules may be configured, for example, to perform the steps of described and illustrated in the context of FIGS. 1, 2, 3A, 3B and 3C.

Figure 4:
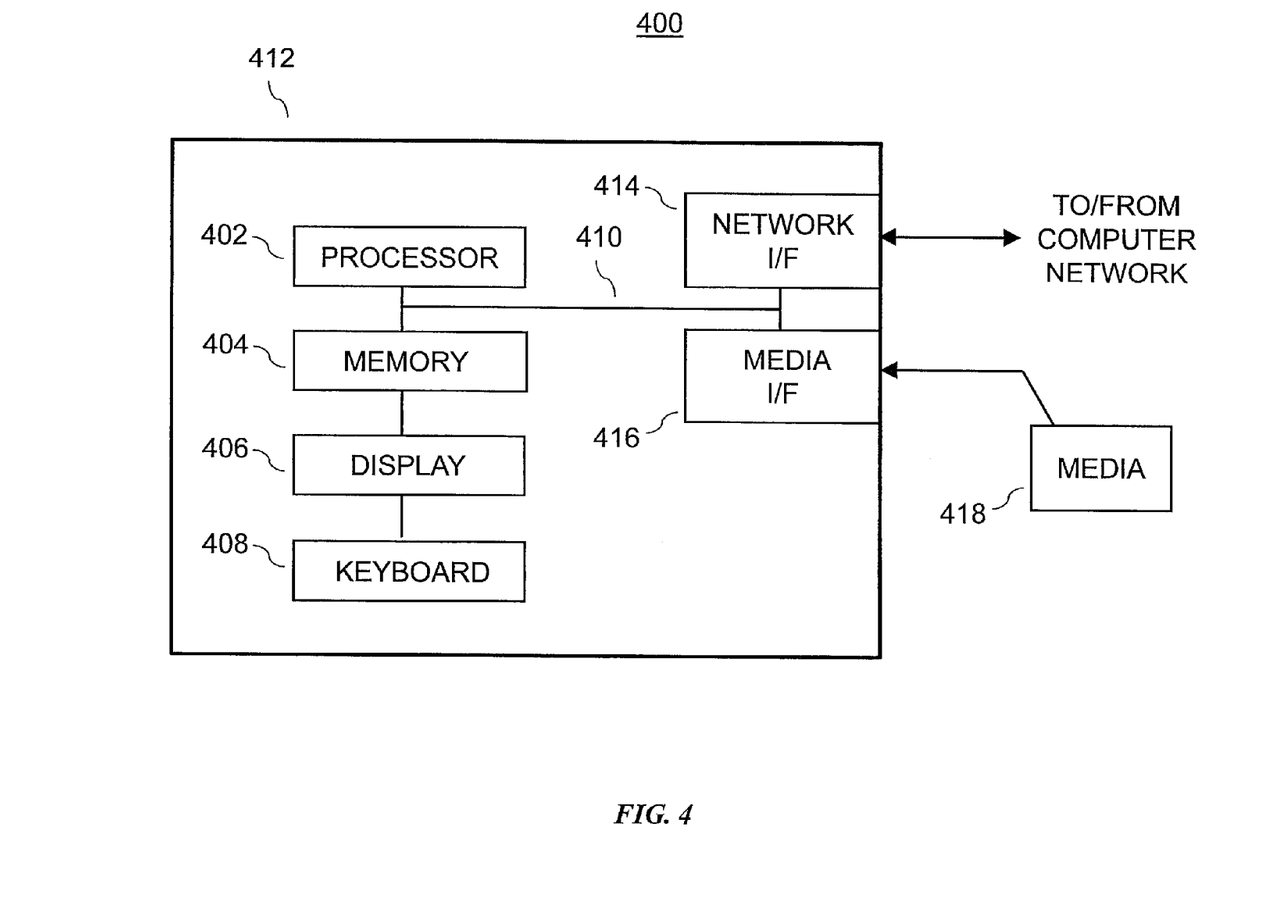
FIG. 4 depicts a computer system that may be useful in implementing one or more aspects and/or elements of the invention.

One or more embodiments can make use of software running on a general purpose computer or workstation. With reference to FIG. 4, such an implementation 400 employs, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 402, memory 404, and input/output interface such as display 406 and keyboard 408 can be interconnected, for example, via bus 410 as part of a data processing unit 412. Suitable interconnections, for example, via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 408, display 406, pointing device, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

It is understood that even though specific embodiments and examples presented herein relate to, for example, the dynamic pricing of a single resource, embodiments of the invention are not so limited. Techniques and embodiments of the invention may, for example, address dynamic pricing for a plurality of resources.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing a plurality of processes in a repository of a computer system, the method comprising:
summarizing a collection of processes stored in the repository of the computer system, wherein summarizing comprises summarizing content included in process descriptions of the plurality of processes in the repository, wherein summarizing comprises:
forming a difference model comprising one or more features that are used to discern differences between processes in the collection of processes, wherein the one or more features include one or more semantic features that describe what a process does;
forming a priority model that represents a priority among the one or more features of the difference model, wherein the priority of a given feature is indicative of a relative importance of the given feature in discerning differences between processes in the collection of processes;
generating a content-based summary of the plurality of processes in the repository using the difference model and the priority model, wherein generating a content-based summary comprises parsing the plurality of processes into components, using the difference model to identify parsed components of the plurality of processes which are associated with the one or more features of the difference model, computing distance measures between the identified parsed components of the plurality of processes, and processing the distance measures to generate the content-based summary; and
organizing the plurality of processes in the repository of a computer system according to the content-based summary;
wherein the summarizing, forming, generating, and organizing steps are implemented by a processor device.

2. The method of claim 1, wherein the one or more semantic features comprise at least one of a goal, a policy, a metric, a sub-process, and a semantic annotation.

3. The method of claim 1, wherein the one or more features include a syntactic feature.

4. The method of claim 1, wherein parsing the plurality of processes into components is performed according to the one or more features of the difference model.

5. The method of claim 1, wherein computing distance measures between the identified parsed components of the plurality of processes comprises calculating one or more distances measures associated with differences among the plurality of processes according to the one or more features of the difference model.

6. The method of claim 5, wherein the one or more distance measures is calculated according to results from parsing the plurality of processes according to the one or more features of the difference model.

7. The method of claim 1, wherein processing the distance measures to generate the content-based summary comprises aggregating at least a subset of common processes of the plurality of processes.

8. The method of claim 7, wherein all processes within any one subset are similar to one another according to a measure of similarity.

9. The method of claim 1, wherein generating a content-based summary of the plurality of processes in the repository using the difference model and the priority model further comprises analyzing the plurality of processes according to the priority model.

10. The method of claim 9, wherein analyzing the plurality of processes according to the priority model comprises analyzing the plurality of processes according to the priorities for each of the one or more features.

11. The method of claim 1, wherein organizing the plurality of processes comprises arranging the plurality of processes according to at least one of: (i) factors common among two or more processes of the plurality of processes; (ii) one or more distance measures among the plurality of processes; and (iii) novelty of one or more processes of the plurality of processes.

12. The method of claim 1, further comprising forming a summary of the plurality of processes that are organized according to the content-based summary.

13. The method of claim 12, further comprising storing the summary in a summary repository.

14. The method of claim 12, further comprising analyzing the summary according to a query of a user.

15. The method of claim 1, wherein at least one of the difference model and the priority model are formed according to information from a user associated with one or more queries from the user.

16. A system for managing a plurality of processes in a repository of a computer system, the system comprising:
a memory storing program instructions; and
a processor to execute the stored program instructions to instantiate a plurality of modules, the plurality of modules comprising:
a process content summarizing module operative to summarize a collection of processes stored in the repository of the computer system by summarizing content included in process descriptions of the plurality of processes in the repository, wherein the process content summarizing module comprises:
a difference model forming module operative to form a difference model comprising one or more features that are used to discern differences between processes in the collection of processes, wherein the one or more features include one or more semantic features that describe what a process does;
a priority model forming module operative to form a priority model that represents a priority among the one or more features of the difference model, wherein the priority of a given feature is indicative of a relative importance of the given feature in discerning differences between processes in the collection of processes; and
a content-based summary module operative to generate a content-based summary of the plurality of processes in the repository using the difference model and the priority model, wherein the content-based summary module comprises a first analyzing module operative to parse the plurality of processes into components, to use the difference model to identify parsed components of the plurality of processes which are associated with the one or more features of the difference model, to compute distance measures between the identified parsed components of the plurality of processes, and to process the distance measures to generate the content-based summary; and
an organizing module operative to organize the plurality of processes in a repository of a computer system according to the content-based summary.

17. The system of claim 16, wherein the plurality of modules further comprise a summary forming module operative to form a summary of the plurality of processes that are organized according to the content-based summary.

18. The system of claim 16, wherein the plurality of modules further comprise a third analyzing module operative to analyze the summary according to a query of a user.

19. An article of manufacture for managing a plurality of processes in a repository of a computer system, the article of manufacture comprising a non-transitory computer readable storage medium tangibly embodying computer readable program code which, when executed, causes a computer to:
summarize a collection of processes stored in the repository of the computer system by summarizing content included in process descriptions of the plurality of processes in the repository, wherein in summarizing process content, the computer readable program code which, when executed, causes the computer to:
form a difference model comprising one or more features that are used to discern differences between processes in the collection of processes, wherein the one or more features include one or more semantic features that describe what a process does;
form a priority model that represents a priority among the one or more features of the difference model, wherein the priority of a given feature is indicative of a relative importance of the given feature in discerning differences between processes in the collection of processes;
generate a content-based summary of the plurality of processes in the repository using the difference model and the priority model, wherein a content-based summary is generated using a process comprising parsing the plurality of processes into components, using the difference model to identify parsed components of the plurality of processes which are associated with the one or more features of the difference model, computing distance measures between the identified parsed components of the plurality of processes, and processing the distance measures to generate the content-based summary; and
organize the plurality of processes in the repository of a computer system according to the content-based summary.

20. The article of manufacture of claim 19, wherein the one or more semantic features comprise at least one of a goal, a policy, a metric, a sub-process, and a semantic annotation.

21. The article of manufacture of claim 19, wherein the one or more features include a syntactic feature.

22. The article of manufacture of claim 19, wherein parsing the plurality of processes into components is performed according to the one or more features of the difference model.

23. The article of manufacture of claim 19, wherein computing distance measures between the identified parsed components of the plurality of processes comprises calculating one or more distances measures associated with differences among the plurality of processes according to the one or more features of the difference model.

24. The article of manufacture of claim 19, wherein processing the distance measures to generate the content-based summary comprises aggregating at least a subset of common processes of the plurality of processes.

* * * * *